United States Patent [19]

Gripshover et al.

[11] Patent Number: 5,162,972
[45] Date of Patent: Nov. 10, 1992

[54] LIQUID FILLED VARIABLE CAPACITOR

[75] Inventors: Ronald J. Gripshover; David B. Fenneman, both of King George, Va.

[73] Assignee: The United States of America as represented by the Secretary of the Navy, Washington, D.C.

[21] Appl. No.: 363,691

[22] Filed: Mar. 30, 1982

[51] Int. Cl.$^5$ .............................. H01G 5/00; H01G 4/04
[52] U.S. Cl. ..................................... 361/277; 361/327
[58] Field of Search .............. 361/271, 272, 274, 277, 361/284, 287, 327

[56] References Cited

U.S. PATENT DOCUMENTS 2,562,972  8/1951  Wald ............................. 361/327 X
3,478,589  11/1969  Birken ........................... 361/327 X Primary Examiner—Donald A. Griffin
Attorney, Agent, or Firm—John D. Lewis; Kenneth E. Walden

[57] ABSTRACT

A liquid filled variable capacitor or PFL which provides variable frequency, impedance, and pulse length without changing the capacitor or PFL hardware. The capacitor is constructed from two or more conducting surfaces. A dielectric fluid mixture separates the conductors. A fluid supply system furnishes the dielectric fluid mixture to the conductors and provides for varying of the dielectric constant of the fluid and thus the capacitor operating characteristics, by varying the mixture composition. The fluid supply system has a mixing tank connected to both a supply of high dielectric constant fluid and a supply of low dielectric constant fluid. The high dielectric constant fluid and low dielectric constant fluid are mixed proportionally to obtain a dielectric fluid having the desired dielectric constant. A pump conveys the dielectric fluid between the mixing tank and the conductors while a heat exchanger controls the temperature of the dielectric fluid.

18 Claims, 1 Drawing Sheet

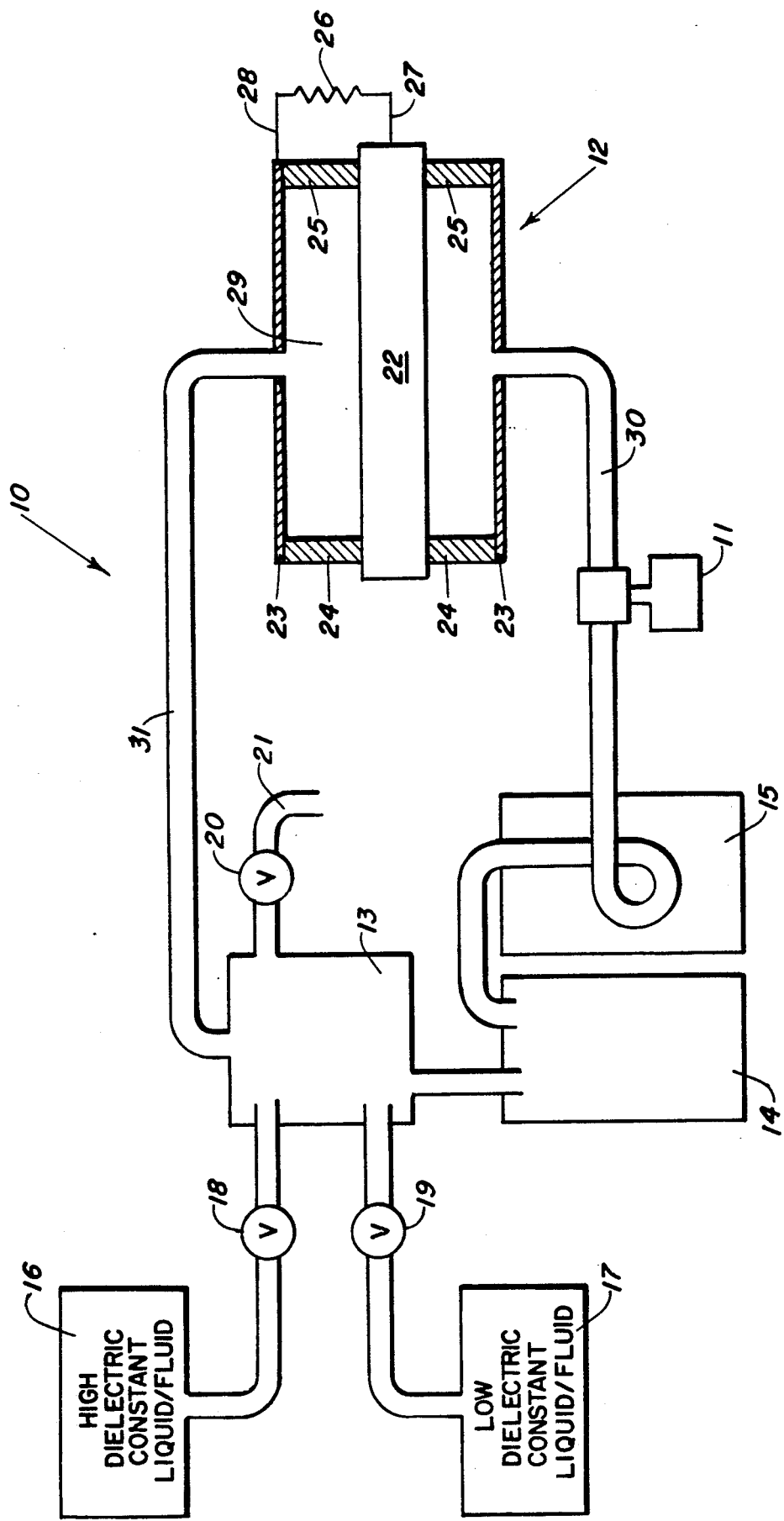

LIQUID FILLED VARIABLE CAPACITOR

BACKGROUND OF THE INVENTION

High pulse power systems are needed for many applications, such as particle beam weapons, high energy lasers, weapons simulation and nuclear fusion. These systems require an intermediate energy store to deliver high peak power from moderate power sources. Usually the energy is stored in a pulse forming line (PFL). To optimize the performance of the storage system it is frequently desirable to change the impedance and the pulse length of the pulse forming line without changing the system hardware which is cumbersome and expensive.

It is also desirable to vary the frequency of a series of expendable oscillators in the high frequency range by varying the capacitance of the system. The oscillators operate with high capacitance, voltage and peak power. Solid dielectric capacitors do not permit easy changes in capacitance to adjust the operating frequency of the jammer. The liquid filed variable capacitor of the subject invention provides for the mixing of liquids having different dielectric constants so as to provide a capacitor with a frequency which is adjustable over a large range.

SUMMARY OF THE INVENTION

Accordingly, there is provided in the present invention a liquid filled variable capacitor or pulse forming line which provides for variable impedance, pulse length and frequency without changing the capacitor pulse forming line hardware.

The capacitor is constructed with an inner electrical conductor which is coaxially mounted in and insulated from a hollow outer conductor. The inner conductor is separated from the outer conductor by a dielectric fluid which can be varied as to the dielectric constant so as to change the operating characteristics of the capacitor.

A fluid supply system furnishes the dielectric fluid to the conductors and provides for varying the dielectric constant of the fluid. The fluid supply system has a mixing tank which is provided with a supply of high dielectric constant fluid from a first storage tank and a supply of low dielectric constant fluid from a second storage tank. The mixing tank is also provided with a valve manifold and drain connection to allow the high dielectric constant fluid and low dielectric constant fluid to be proportionally mixed to obtain a dielectric fluid having the desired dielectric constant.

The dielectric fluid is conveyed between the mixing tank and the conductors by a pump while a heat exchanger is used to control the temperature of the dielectric fluid and fine tune the dielectric constant of the fluid. The fluid system is also provided with a purifier and sensors for monitoring the temperature and dielectric constant of the fluid.

OBJECTS OF THE INVENTION

It is an object of the present invention to provide a capacitor having variable operating characteristics.

Another object of the present invention to provide a pulse forming line having variable impedance and pulse length.

Another object of the present invention to provide a fluid filled capacitor having a variable dielectric constant.

A further object of the present invention to provide a capacitor with variable operating characteristics without changing the geometry of the capacitor.

Another object of the present invention to provide a variable pulse forming line for accurate impedance matching to a load without changing the pulse forming line hardware.

A still further object of the present invention to provide a liquid filled variable capacitor which can very the frequency of an L-C oscillator over a wide range.

Other objects, advantages and novel features of the present invention will become apparent from the following detailed description of the invention when considered in conjunction with the drawing.

BRIEF DESCRIPTION OF THE DRAWING

A more complete appreciation of the invention and many of the attendant advantages thereof will be readily understood by reference to the following detailed description when considered with the accompanying drawing which illustrates in diagram form the liquid filled variable capacitor of the subject invention.

DETAILED DESCRIPTION OF THE PREFERRED EMBODIMENT

Referring to the FIGURE, there is disclosed in diagram form a liquid filled variable capacitor system 10 of the subject invention which can be used in pulse power systems requiring an intermediate energy store to deliver high peak power from moderate power sources. The energy is stored in the electric field of a pulse forming line 12.

Pulse forming line or capacitor 12 is constructed with an inner electrical conductor 22 which is mounted in and insulated from outer electrical conductor 23 by insulators 24 and 25. Inner conductor 22 and outer conductor 23 are connected to load 26 by electrical connectors 27 and 28 respectively.

Inner electrical conductor 22 may be a hollow member which is coaxially mounted in a hollow outer electrical conductor 23. Both inner conductor 22 and outer conductor 23 may be cylindrical in shape, although this is not a requirement of the invention, and can be considered from material having good conductive properties such as copper, aluminum, brass or stainless steel. The inner conductor may be 3-5 feet in diameter, for example, while the outer conductor is 4-7 feet in diameter, for example. It is also contemplated that inner conductor 22 may be an inner plate positioned between two outer plates which together from outer conductor 23 or any transmission line configuration having oppositely charged surfaces such as strip line, triplate, Blumeline, parallel plates, etc.

Inner conductor 22 is separated from outer conductor 23 by chamber 29 which is filled with dielectric fluid of a known dielectric constant. A change in the dielectric constant of the fluid separating inner conductor 22 from outer conductor 23 results in a change in the operating characteristics of the capacitor.

The impedance ($Z_c$) of pulse forming line is given by:

$$Z_c = \sqrt{\frac{L_e}{C_e}}$$

where $L_e$ and $C_e$ are the inductance and capacitance for unit length of the transmission line.

For a given pulse forming line the characteristic impedance is equal to $\sqrt{\mu/\epsilon}$ multiplied by geometric factors of the line. ($\mu$ is the permeability of the medium and $\epsilon$ is the permittivity of the medium. A more common tern, the relative permittivity or dielectric constant is defined as $\epsilon_r = \epsilon/\epsilon_o$ where $\epsilon_o$ is the permittivity of free space. Hence $\epsilon_r = 1$ for free space).

For example, a coaxial transmission line has a characteristic impedance of:

$$Z_c = \frac{1}{2\pi} \sqrt{\frac{\mu}{\epsilon_r \epsilon_o}} \ln \frac{b}{a}$$

where 'b' is the radius of the outer conductor and 'a' is the radius of the inner conductor.

The pulse length T of a matched transmission line is given by $T = 2 d/v$ where v is the velocity of propagation and d is the length of the transmission line. In a uniform linear medium $$v = \frac{1}{\sqrt{\mu \epsilon_r \epsilon}},$$

Then $T = 2d\sqrt{\mu \epsilon_o \epsilon_r}$ (i.e., the pulse length is proportional to $\sqrt{\epsilon_r}$. From the above equations it can be seen that the characteristic impedance ($Z_c$) and pulse length (T) of a capacitor can be varied, without altering the structure of the capacitor, by changing the relative permittivity ($\epsilon_r$) or dielectric constant of the dielectric fluid. In addition, if the capacitor is to be used in an L-C oscillator, where the frequency changes as the square root of the capacitance, then the frequency of the oscillator could be varied over a wide range.

Varying the relative permittivity ($\epsilon_r$) of the dielectric fluid separating the two conductors may be accomplished either by varying the temperature of the fluid, for small changes, or by mixing fluids having different dielectric constants. For example, a fluid such as water with a high dielectric constant, $\epsilon_r = 76.5$ at 30° C. or $\epsilon_r = 88$ at 1° C., may be mixed with a lower dielectric constant fluid such as glycerin, $\epsilon_r = 42.5$, or ethylene glycol, $\epsilon_r = 37$. Any miscible fluids of differing dielectric constants may be used to obtain a fluid having the desired dielectric constant. The approximate dielectric constant of the fluid may be chosen by selection of the mixture with the fine tuning of the dielectric constant being accomplished by changing the temperature of the mixture.

Of particular interest as a dielectric fluid is ethylene glycol-water mixture. This liquid has a much higher resistivity (especially when cooled) and hence increases the time the transmission line can hold charge before internal dissipation takes place. This can reduce drastically the complexity and cost of the charging circuitry. Some mixtures, actively purified, can hold charge for considerably longer times (on the order of milliseconds or more) than pure water (on the order of microseconds). This allows great reduction in cost and complexity of the charging circuitry.

Referring again to the FIGURE, liquid filled variable capacitor system 10 is provided with a mixing tank 13 having drain line 21 controlled by drain valve 20. Mixing tank 13 is hydraulically connected to fluid supply or storage tanks 16 and 17 with tank 16 supplying a high dielectric constant fluid to mixing tank 13 and tank 17 supplying a low dielectric constant fluid to mixing tank 13. Fluid flow from tank 16 to mixing tank 13 is controlled by outlet valve 18 while flow from tank 17 to mixing tank 13 is controlled by outlet valve 19.

Capacitor system 10 is also provided with a purifier 14, which is hydraulically connected to mixing tank 13, and a heat exchanger 15 for adjusting the temperature of the dielectric fluid. A fluid supply line 30 and pump 11 convey the mixed dielectric fluid to capacitor 12 while a return line 31 transports the fluid from the capacitor to mixing tank 13. Capacitor system 10 is provided with temperature and dielectric sensors (not shown) for monitoring the operating conditions of the system.

If the temperature of liquid filled variable capacitance system 10 remains constant, the impedance of capacitor 12 will remain constant. To change the impedance of capacitor 12 to a hither value, low dielectric constant fluid from supply tank 17 is introduced into mixing tank 13 by means of valve 19. The excess fluid from mixing tank 13 is drained by means of drain line 21 and vavle 20. The low dielectric fluid is added to mixing tank 13 until the desired dielectric constant is obtained.

To change the impedance of capacitor 12 to a lower value, high dielectric fluid from storage tank 16 is introduced to mixing tank 13 by means of valve 18. Again, the excess fluid may be drained from tank 13 by drain line 21 and valve 20. The impedance of the dielectric fluid can also precisely varied over a small range by varying the temperature of the dielectric fluid by means of heat exchanger 16.

It is thus apparent that the disclosed liquid filled variable capacitor provided a capacitor having variable operating characteristics such as impedances and pulse length without attendant changes in capacitor geometry. The capacitor can be used in an L-C oscillator to provide a large frequency range.

Many obvious modifications and embodiments of the specific invention, other than those set forth above, will readily come to mind to one skilled in the art having the benefit of the teaching presented in the foregoing description and the accompanying drawing of the subject invention and hence it is to be understood that such modifications are included within the scope of the appended claims.

What is claimed as new and desired to be secured by Letters Patent of the United States is:

1. A capacitor having a variable impedance and a variable pulse length, comprising:
   first conductive means;
   second conductive means;
   dielectric means separating the first and second conductive means; and
   means varying the dielectric constant of the dielectric means comprising:
   a supply of high dielectric constant liquid;
   a supply of low dielectric constant liquid; and
   means furnishing the high dielectric constant liquid and low dielectric constant liquid to the first and second conductive means.

2. A capacitor as in claim 1 further comprising means varying the temperature of the dielectric means.

3. A capacitor as in claim 2 wherein the means varying the temperature of the dielectric means comprises a heat exchanger.

4. A capacitor as in claim 1 wherein the first conductive means is an inner conductor.

5. A capacitor as in claim 4 wherein the second conductive means is a hollow outer conductor, said conductor being coaxially mounted in and insulated from the outer conductor.

6. A capacitor as in claim 1 wherein the furnishing means comprises:
   mixing means combining the high dielectric constant liquid and low dielectric constant liquid to form the dielectric means; and
   means conveying the dielectric means to the first and second conductive means.

7. A capacitor as in claim 6 wherein the furnishing means further comprises means returning the dielectric means from the conductive means to the mixing means.

8. A capacitor as in claim 6 wherein the furnishing means further comprises means draining the mixing means.

9. A capacitor as in claim 6 wherein the furnishing means further comprises means purifying the dielectric means.

10. A capacitor as in claim 1 wherein the first conductive means is a first plate.

11. A capacitor as in claim 10 wherein the second conductive means is a pair of plates with first plate positioned between the pair of plates.

12. A capacitor as in claim 10 wherein the second conductive means is a second plate.

13. A capacitor as in claim 1 wherein the first conductive means and second conductive means form a transmission line.

14. A capacitor for pulse forming lines having a variable impedance and variable pulse length, comprising:
   a first conductor;
   a second hollow conductor having the first conductor mounted in and insulated from the second conductor;
   a dielectric fluid separating the first and second conductors;
   a fluid supply system for varying the dielectric constant of the dielectric fluid, said fluid supply comprising:
   a supply of high dielectric constant fluid;
   a supply of low dielectric constant fluid;
   a mixing tank for combining the high dielectric constant fluid and the low dielectric constant fluid;
   a pump conveying the dielectric fluid from the mixing tank to the first and second conductors and from the conductors to the mixing tank; and
   means varying the temperature of the dielectric fluid.

15. A variable impedance capacitor, comprising:
   a first conductor
   a second conductor;
   a dielectric fluid separating the first and second conductors; and
   means varying the dielectric constant of the dielectric fluid, comprising:
      means mixing fluids having differing dielectric constants;
      means conveying the dielectric fluid to and from the first and second conductors; and
      means varying the temperature of the dielectric fluid.

16. A capacitor as in claim 15 wherein the mixing means comprises:
   a mixing tank;
   a high dielectric constant fluid supplied to the mixing tank;
   a low dielectric constant fluid supplied to the mixing tank; and
   means for draining the mixing tank.

17. A capacitor as in claim 15 wherein the dielectric fluid is provided with dielectric sensors and temperature sensors.

18. A capacitor as in claim 15 wherein the first conductive means is a first electrically charged surface and the second conductive mans is a second electrically charged surface having an opposite charge from the first surface.

* * * * *